United States Patent [19]

Savant

[11] Patent Number: 5,697,181
[45] Date of Patent: Dec. 16, 1997

[54] BRACKET FOR ATV GUN RACK

[76] Inventor: Kevin D. Savant, P.O. Box 520, Kinder, La. 70648

[21] Appl. No.: 558,624

[22] Filed: Nov. 13, 1995

[51] Int. Cl.⁶ .............................. B62J 7/06; B62J 11/00; F41A 27/00
[52] U.S. Cl. ........................... 42/94; 224/420; 211/64
[58] Field of Search ...................... 42/94; 248/125.7, 248/300, 220.1; 211/64; 69.9; 224/420, 441, 450; 89/37.04, 40.03, 40.05

[56] References Cited

U.S. PATENT DOCUMENTS

| | | | |
|---|---|---|---|
| 1,222,525 | 5/1917 | Sweet | 248/300 |
| 4,253,077 | 2/1981 | Wardell et al. | 335/212 |
| 4,417,403 | 11/1983 | Strange | 33/265 |
| 4,607,772 | 8/1986 | Hancock | 224/30 |
| 4,641,451 | 2/1987 | Harris | 42/85 |
| 4,823,673 | 4/1989 | Downing | 89/37.04 |
| 4,937,965 | 7/1990 | Narvaez | 42/94 |
| 4,949,929 | 8/1990 | Kesselman et al. | 248/300 |
| 5,265,781 | 11/1993 | Nichols | 224/198 |
| 5,326,060 | 7/1994 | Chubb et al. | 248/231.9 |
| 5,487,497 | 1/1996 | Kwiatkowski | 224/41 |
| 5,568,672 | 10/1996 | Mullet et al. | 16/94 R |

Primary Examiner—Michael J. Carone
Assistant Examiner—Christopher K. Montgomery
Attorney, Agent, or Firm—Robert N. Montgomery

[57] ABSTRACT

An L-shaped bracket having holes and slots for adaptable attachment to gun racks used on All Terrain Vehicles. The bracket being rotatable in the horizonal plane thereby allowing for gun rotation to any position relative to the vehicle. The bracket further allowing adjustment of the rack in the vertical plane thus providing for gun elevation and depression.

3 Claims, 4 Drawing Sheets

BRACKET FOR ATV GUN RACK

BACKGROUND OF THE INVENTION

1. Field of the Invention

The present invention relates to the field of gun racks for All Terrain Vehicles which may also include motorcycles and more particular to a pivotal bracket adaptable to at least one such gun rack.

2. General Background

Gun racks have been adapted to ATV'S for carrying hunting rifles almost since such vehicles have been in existence. Gun racks have been designed to transport a hunter's gun in a safe manner over very rough terrain. In most cases the racks are adapatably mounted to the vehicle's handle bars in a manner whereby the weapon is clamped with the barrel pointed forward. This configuration places the gun barrel in an unprotected position and places the gun stock adjacent the rider's chest. In the event of an collision the impact could drive the gun stock rearwardly into the rider causing serious injury and causing severe damage to the gun.

SUMMARY OF THE PRESENT INVENTION

The present invention provides a bracket means for an ATV mounted gun rack which allows the clamped gun to be rotated 360 degrees in the horizontal plane and tilted by approximately 15 degrees above or below the horizontal plane. The disclosed bracket, adaptable to most such gun racks, allows the gun to be rotated and pivoted into a more protected position. Thereby providing safer transport for the rider and the weapon.

It is therefore an object of the present invention to provide a bracket, adaptable to new or existing ATV gun mounts which allows for rotation and pivotal displacement of the weapons located thereon.

It is also an object of the present invention to provide a method of compensating for misalignment resulting from mismatch between handel bar configuration and gun mount, thereby allowing the weapon to be leveled if desired.

A further object is to provide a safer and more protective transport for weapons attached to ATV'S.

Still a further object of the invention is to allow for easy removal of the weapon support member without removal of the entire gun mount after each hunting season.

BRIEF DESCRIPTION OF THE DRAWINGS

For a further understanding of the nature and objects of the present invention, reference should be had to following detailed description taken in conjunction with the accompanying drawings, in which, like parts are given like reference numerals, and wherein.

DETAILED DESCRIPTION OF THE PREFERRED EMBODIMENT

Figure 1:
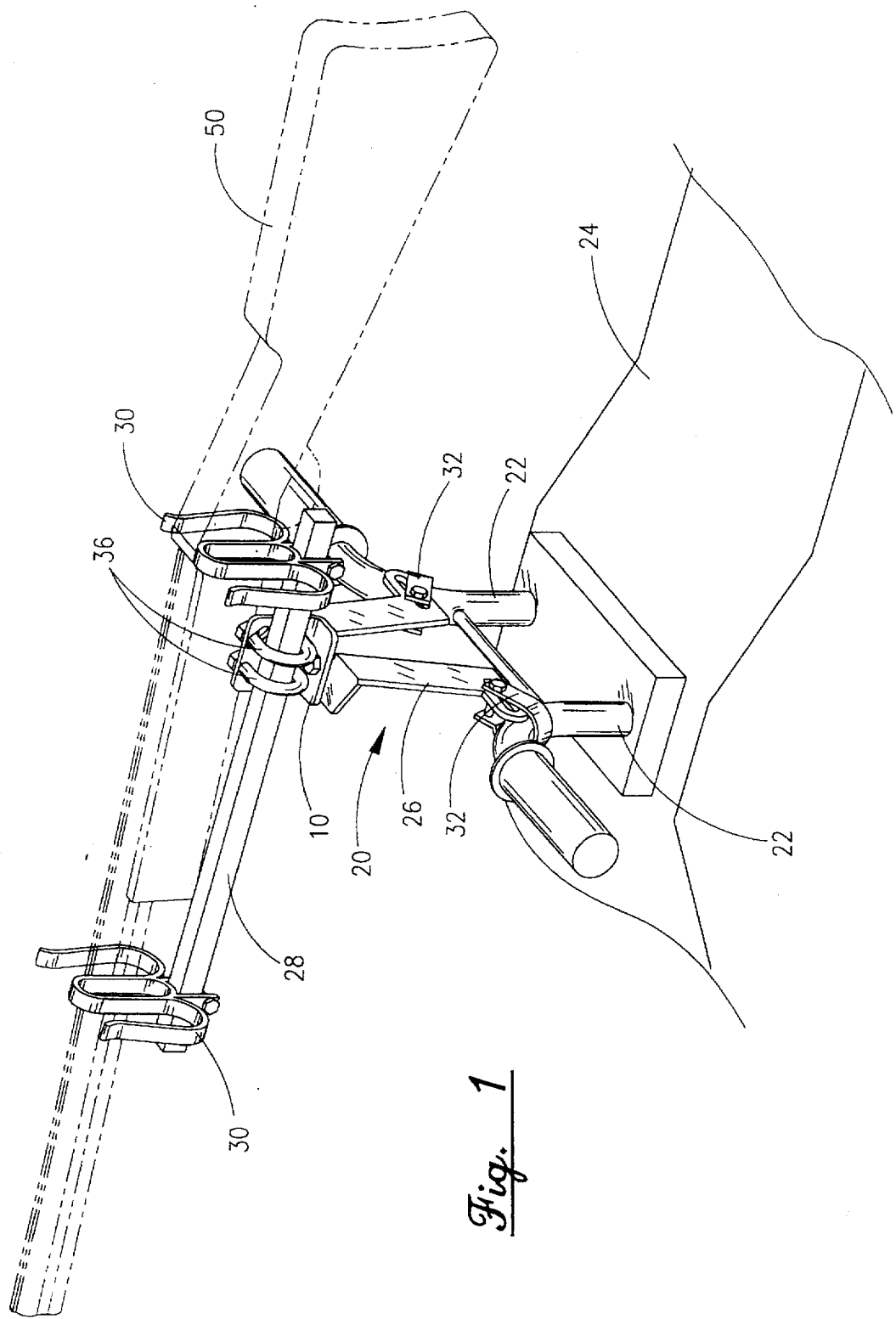
FIG. 1 is an isometric view of the invention as installed on an ATV gun mount.
Figure 2:
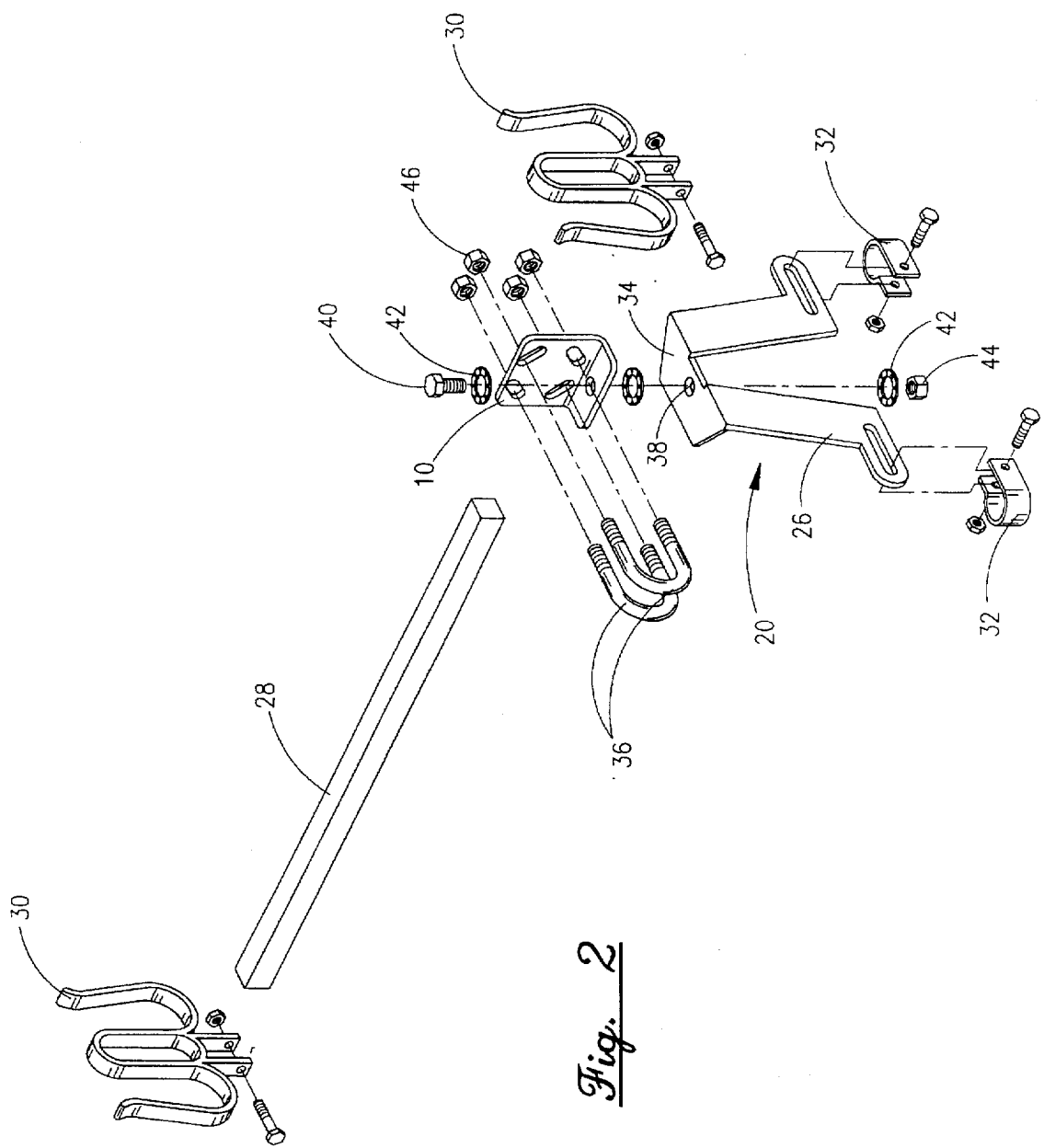
FIG. 2 is an explode view of the invention and its mounting arrangement on an ATV gun mount.

FIG. 1 depicts the present invention, a pivotable angle bracket 10, as may be used with a typical gun mount 20 attached to the handle bars 22 of an All Terrain Vehicle 24. The gun mount 20 usually comprises a base mount 26, a liner bar 28, and weapons clamps 30. An exploded view of the gun mount showing the location of the pivot bracket 10 is best seen in FIG. 2. Here we see the base mount 26 as further having clamps 32 and for attaching the base mount to an ATV's handle bars 22. Since handle bars may be supplied in any number configuration depending on make and model of the vehicle, it is often difficult to insure that the upper portion of the mount 34 remains level relative to the ATV.

Figure 3:
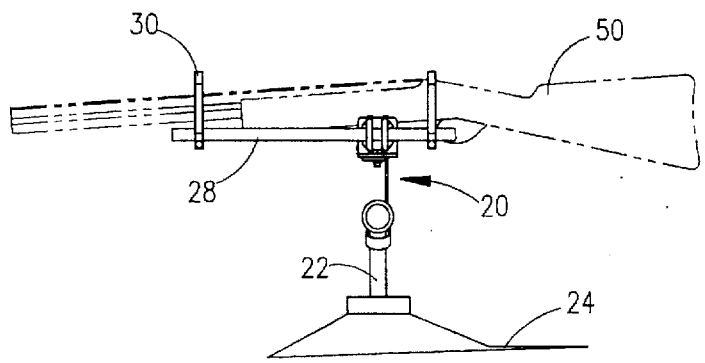
FIG. 3 is a side elevation view of an ATV gun mount utilizing the invention for positioning a weapon in a level position.
Figure 4:
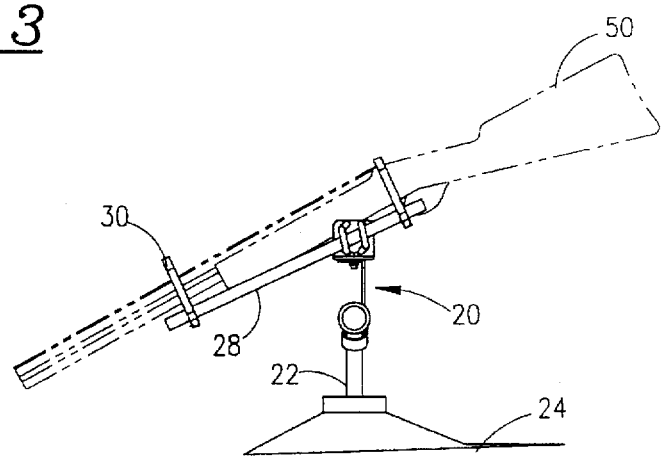
FIG. 4 is a side elevation view of an ATV gun mount utilizing the invention for positioning a weapon in a depressed position.
Figure 5:
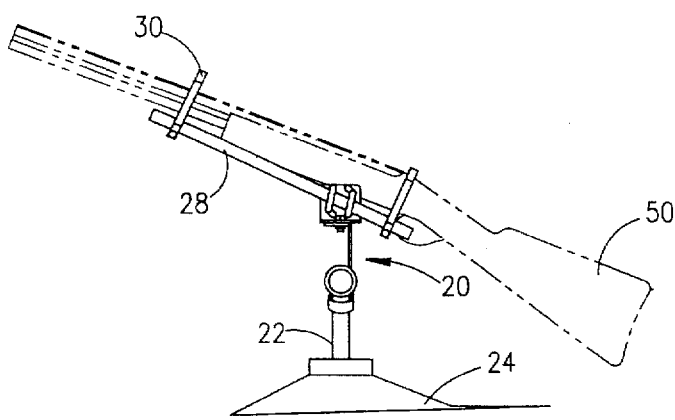
FIG. 5 is a side elevation view of an ATV gun mount utilizing the invention for positioning a weapon in an elevated position.
Figure 6:
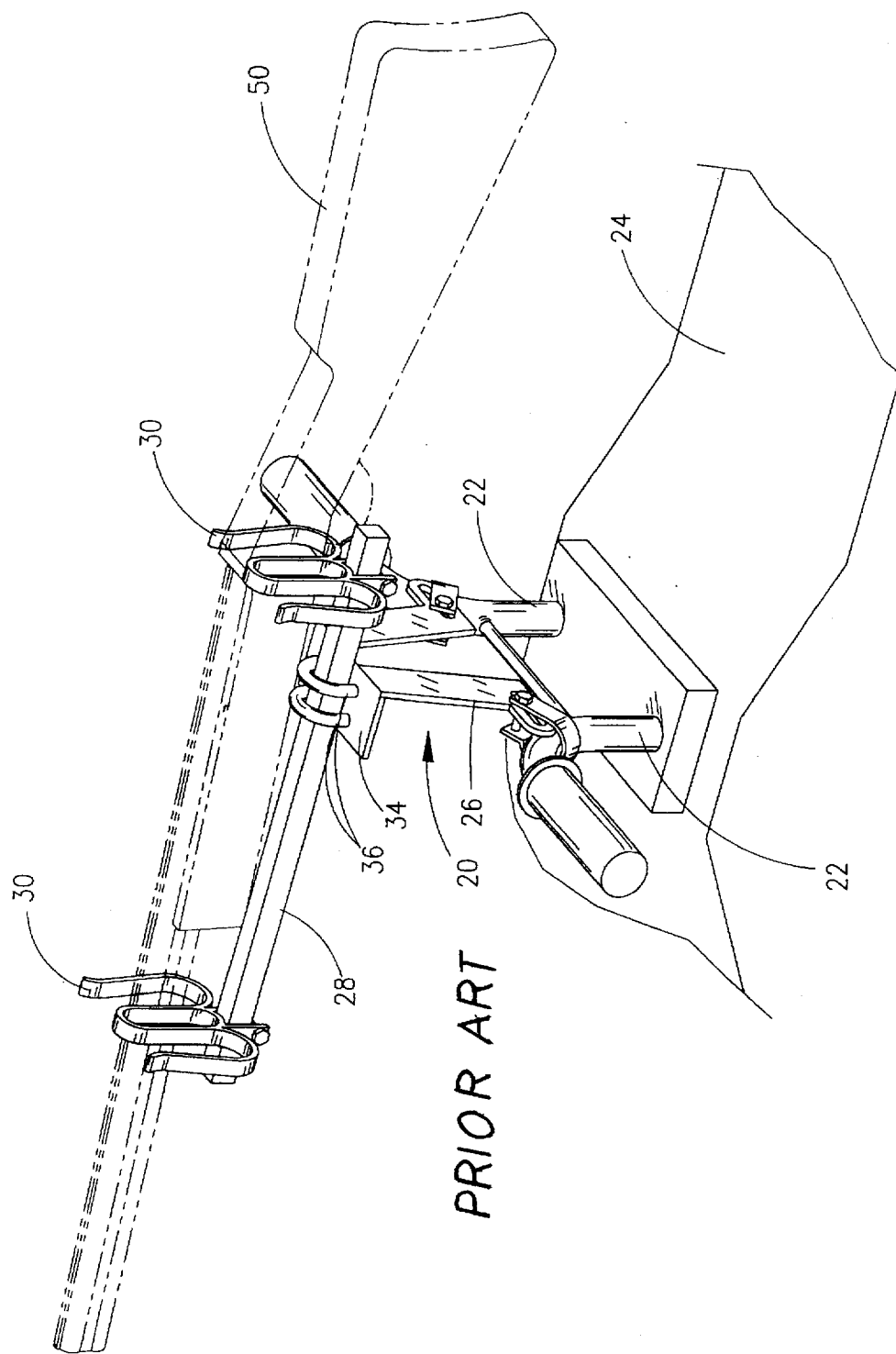
FIG. 6 is an isometric view of a typical gun mount arrangement as installed on an ATV.

As seen in FIG. 6 typically the horizonal portion 34 of such base mounts 26 are usually fitted with a pair of U-bolts 36 for receiving and adjustable clamping a linear bar 28. In most cases this is an acceptable method and provides a level weapons mounting. However, if the base mount does not fit the handel bar configuration precisely or at least within the clamping adjustment range the horizonal portion 34 of the base mount 26 will not be level. Where this is undesirable, the bracket 10 may be inserted by simply drilling a single hole 38 in the base mount 26, upper portion 34, and installing a bolt 40 through the lower leg portion of the pivot bracket 10 via washers 42 and securing the pivot bracket 10 to the base mount 10 with a nut 44. Therefore, a weapon can be leveled as seen in FIG. 3 as a result of the pivot bracket being further provided with slotted holes for receiving the U-Bolts 36 normally used for clamping the liner bar 28. Thereby allowing the bar 28 to be adjusted laterally and rotatable relative to the pivot bracket 10 simply by loosing the nuts 46. The pivot bracket 10 also allows the bar 28 to be rotatable in the horizonal plane pivotal about the central bolt 40 located in the upper base portion 34. With a weapon 50 securely clamped in the clamps 30 which are positionable along the liner bar 28 to accommodate various gun types, the weapon 50 as well the liner bar may be rotated to any position in the horizonal plane. The weapon may also be elevated or depressed to various positions of approximately 15 degrees as seen in FIGS. 4 and 5.

Because many varying and different embodiments may be made within the scope of the inventive concept herein taught, and because many modification may be made in the embodiments herein detailed in accordance with the descriptive requirement of the law, it is to be understood that the details herein are to be interpreted as illustrative and not in any limiting sense.

What is claimed is:

1. An "All Terrain Vehicle" gun rack comprising:
    a) an attachment bracket and means for permitting the securing of said attachment bracket to an "All Terrain Vehicle";
    b) a clamp carrying rod means for receiving a gun; and
    c) a swivelable and pivotable bracket linking said attachment bracket and said rod means, said swivelable and pivotable bracket including means for allowing rotation of said swivelable and pivotable bracket relative to said attachment bracket and means for inclining said rod means relative to said swivelable and pivotable bracket.

2. An "All Terrain Vehicle" gun rack according to claim 1 wherein said attachment bracket is "L" shaped having vertical and horizontal portions, said horizontal portion having a single aperture centrally located therein, and said vertical portion having a plurality of arcuate shaped holes equally spaced on a particular bolt circle without a central aperture.

3. An "All Terrain Vehicle" gun rack according to claim 2 wherein said rod means is slidable relative to said swivelable and pivotable bracket.

* * * * *